United States Patent [19]

Ravenberg et al.

[11] Patent Number: 5,398,960
[45] Date of Patent: Mar. 21, 1995

[54] AIRBAG MODULE DOORS HAVING SLIP-IN AND SNAP-IN TETHER ATTACHMENTS

[75] Inventors: Michael J. Ravenberg, Corinne; David J. Green, Brigham City, both of Utah

[73] Assignee: Morton International, Inc., Chicago, Ill.

[21] Appl. No.: 189,922

[22] Filed: Feb. 1, 1994

[51] Int. Cl.6 .................................................. B60R 21/16
[52] U.S. Cl. ..................... 280/728 B; 280/728 A; 280/732
[58] Field of Search .............. 280/732, 728 B, 731, 280/728 R, 728 A, 743 A

[56] References Cited

U.S. PATENT DOCUMENTS

| 4,925,209 | 5/1990 | Sakurai | 280/728 B |
| 4,941,678 | 7/1990 | Lauritzen et al. | 280/732 |
| 4,964,653 | 10/1990 | Parker | 280/732 |
| 4,986,569 | 1/1991 | Bruton | 280/728 B |
| 5,072,967 | 12/1991 | Batchelder et al. | 280/732 |
| 5,149,127 | 9/1992 | Manabe et al. | 280/731 |
| 5,150,919 | 9/1992 | Sakakida et al. | 280/732 |
| 5,199,739 | 4/1993 | Fujiwara et al. | 280/732 |
| 5,211,421 | 5/1993 | Catron et al. | 280/728 |

FOREIGN PATENT DOCUMENTS

| 0175279 | 11/1987 | Japan | 280/728 B |
| 3-86653 | 4/1991 | Japan | B60R 21/18 |
| 4-208661 | 7/1992 | Japan | 280/728 A |
| 4-353047 | 12/1992 | Japan | 280/728 A |

Primary Examiner—Margaret A. Focarino
Assistant Examiner—Christopher P. Ellis
Attorney, Agent, or Firm—George W. Rauchfuss, Jr.; Gerald K. White

[57] ABSTRACT

A passenger side airbag module for a motor vehicle is designed to engage one end of a cover tether by a slip-fit latch. The other end of the tether is firmly secured to the breakaway portion of the vehicle instrument panel. A secondary latch prevents the anchor from rotating or rattling after installation.

20 Claims, 3 Drawing Sheets

AIRBAG MODULE DOORS HAVING SLIP-IN AND SNAP-IN TETHER ATTACHMENTS

TECHNICAL FIELD

This invention relates to motor vehicle airbag installations. More particularly, it relates to passenger side airbag module door restraints.

BACKGROUND ART

Passenger side airbag systems are comprised of two major components. One component is the airbag module itself. Basically, it is in the form of a reaction canister which houses the inflator and airbag. It may also include a dust cover to protect the airbag. The airbag module is usually manufactured separately for later incorporation into the motor vehicle.

The second component of the passenger side airbag system is the airbag door. This door is normally a portion of the automotive instrument panel but is designed to break away under the influence of the expanding airbag. It is important to restrain the door and limit its travel. One popular method of providing restraint is by use of a strap or tether. This allows a non-rigid attachment such that the fit and finish between the door and the instrument panel may be maintained, even throughout minor adjustments in the positioning of the module assembly. When the connection between the tether and the module assembly is made during the automobile assembly, it is important to provide a simple yet robust connection scheme and to minimize any tendency of the assembly to rattle when the vehicle is in motion.

Accordingly, it is a primary object of the present invention to provide an airbag module assembly wherein the tether to module connection is made by a simple snap-in connection. Other objects, features and advantages will become apparent from the following description and appended claims.

DISCLOSURE OF INVENTION

The invention comprises a flexible tether which has a first end secured to the breakaway door or cover formed in the instrument panel. A tether anchor is secured to the second end of the tether. Means are provided on the module for making a snap-fit engagement with the tether anchor while still providing firm support during cover breakaway.

BEST MODE FOR CARRYING OUT THE INVENTION

Figure 1:
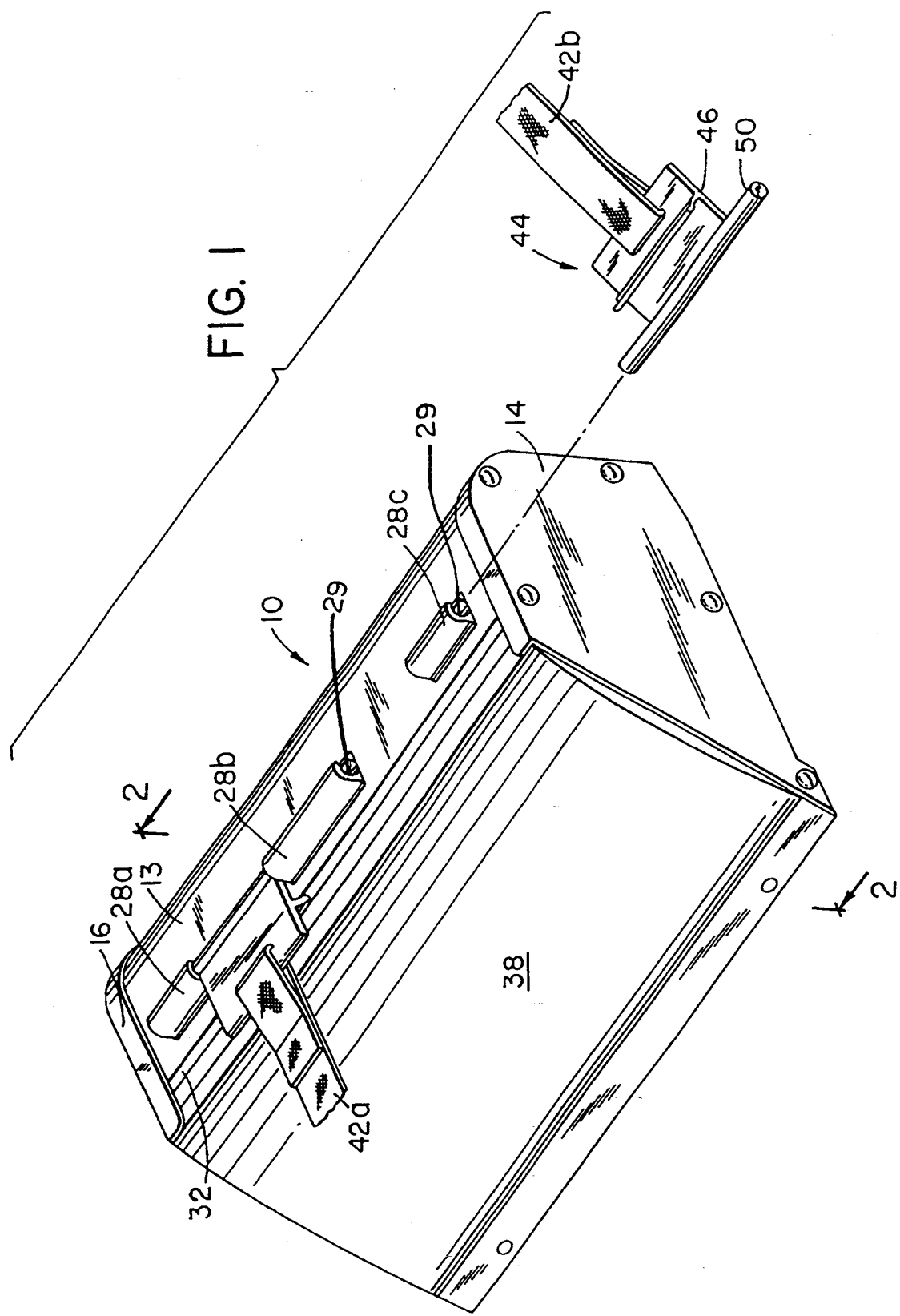
FIG. 1 is an isometric view of a passenger side airbag module assembly in accordance with the present invention including the anchor ends of two tethers.

FIG. 1 illustrates a passenger side airbag module assembly 10. It comprises a trough-shaped reaction canister having sidewalls 12, 13 and a floor 15. The reaction canister may be formed, for example, from an aluminum extrusion. The ends of the reaction canister are closed by end plates 14, 16 so as to house a cylindrical inflator 18 (FIG. 2) and a folded airbag 20. The edges of the sidewalls 12, 13 and end plates 14, 16 opposite the floor 15 form an open mouth. The reaction canister is provided with screw preparations 22 as needed for attaching the end plates and with airbag mouth retaining channels 24, 26. However, as these form no part of the present invention, they will not be further described.

Figure 3:
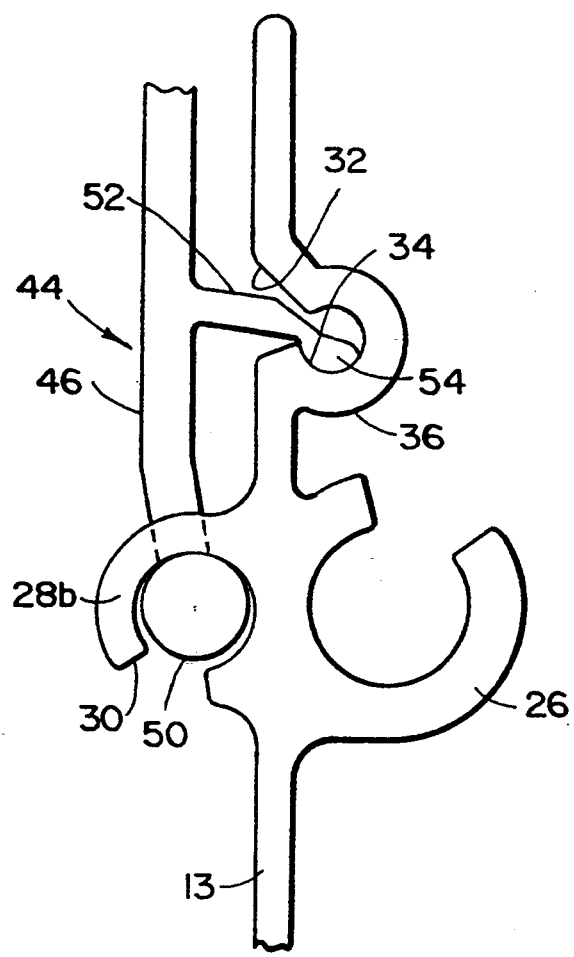
FIG. 3 is an enlarged detail illustrating the manner in which the tether anchor engages the module assembly.

The reaction canister, however, does have additional features which form a part of this invention. In the illustrated embodiment, these include three circular channels 28a, 28b, 28c. These channels are coaxial and extend outwardly from the sidewall 13 of the reaction canister and the cylindrical sidewall of each channel defines a slot 30 (FIG. 3). It is important to note that, as shown in FIG. 1, the opening of each slot 30 faces away from the open mouth of the reaction canister.

The second feature of the reaction canister which relates to this invention comprises a slot 32 which is also formed in the sidewall 13 of the canister between its open mouth and the channels 28. The slot 32 is parallel to the coaxial channels 28 and extends the length of the reaction canister sidewall 13 to form a detent 34 surrounded internally of the canister by a cylindrical extrusion 36, as illustrated in FIG. 3. A dust cover 38 of a material such as paper may optionally be employed to close the mouth of the reaction canister to protect the airbag 20. This is particularly true if the airbag module is to be shipped to the assembly site.

Figure 2:
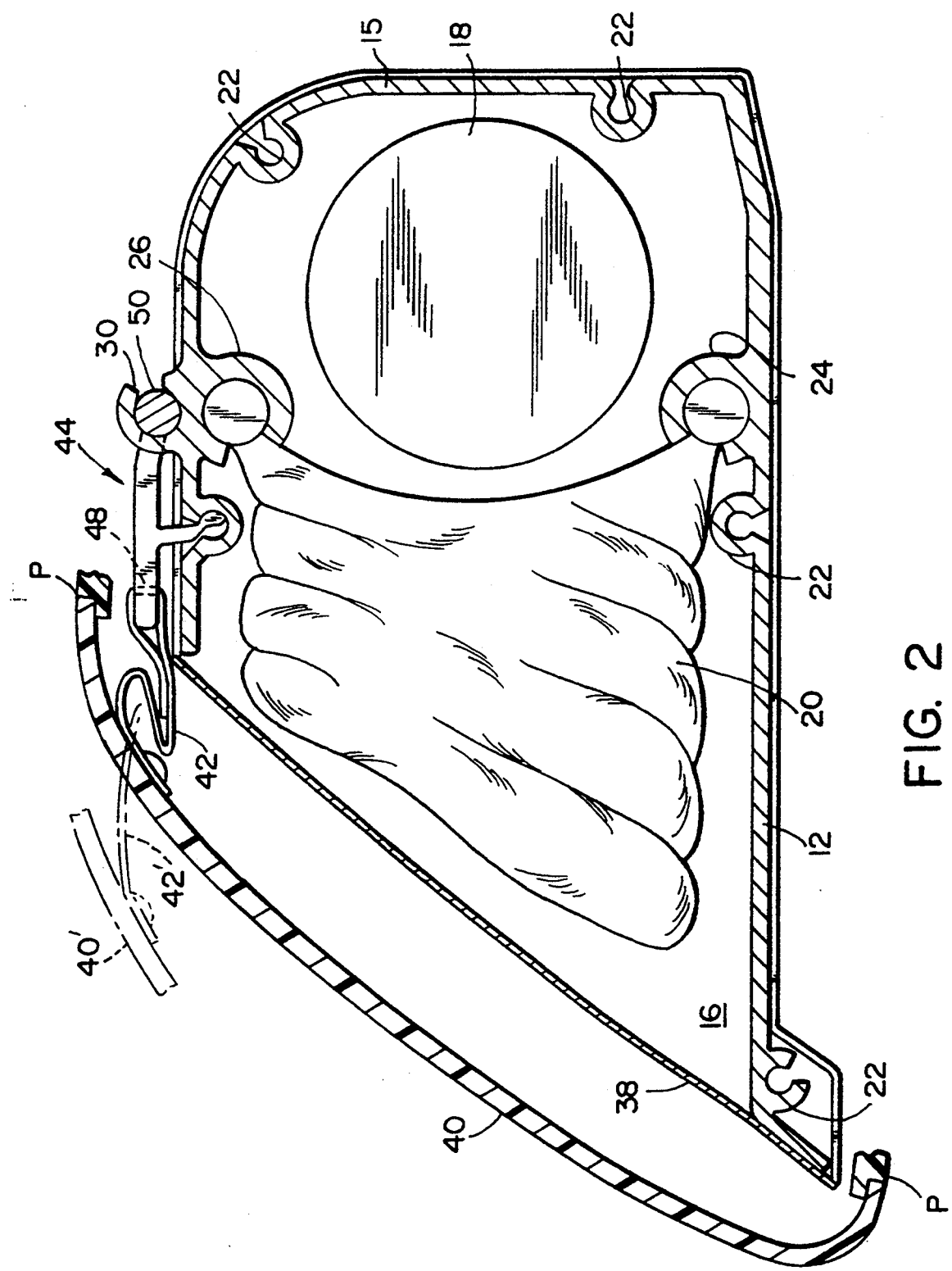
FIG. 2 is a cross-section taken substantially along the line 2—2 of FIG. 1 and including the breakaway door portion of the instrument panel.

The vehicle destined to receive the module assembly of this invention includes an instrument panel P (FIG. 2). The panel has a breakaway cover 40 portion designed to separate from the instrument panel to form one or more doors during airbag deployment. Securely fastened to the breakaway cover 40 is one end of a flexible tether 42. Two such tethers 42a and 42b are illustrated. However, one may be sufficient. The tethers may be of fabric or any other suitable material. The free end of each tether is connected to an anchor 44. As the tether anchors are identical, only one will be described in detail. Each anchor comprises a plate 46 having a slot 48 (FIG. 2) through which the tether 42 is threaded and then secured back upon itself by any suitable means, such as stitching or adhesive. The distal edge of the plate 46 carries a pin 50. The pin 50 extends outwardly from the side edges of the plate 46. The pin 50 can be a unitary pin as shown or can comprise discrete first and second spaced, axially aligned pin members extending from each side edge of the plate 46. As will be apparent from FIG. 1, the dimensions of the plate 46 are such as to be received between one pair of channels 28. Pin 50 is dimensioned so as to slip-fit into channels 28 from the open axial sides 29 thereof and form a male connection with the female channels 28, as illustrated in FIG. 3. Whether unitary or discrete, the pins of an anchor plate 46 are insertable into respective first and second spaced, axially aligned channels 28. Slot 30 permits anchor plate 46 to move axially through channels 28. This slip-fit may be made by the installer after installation of the module assembly 10, without the need for disturbing the fit of cover 40 within the instrument panel P.

In order to prevent any rattle or misalignment of anchor 44 after installation, a latch is provided to retain the anchor 44 in fixed alignment with the reaction canister sidewall 13. As illustrated in FIG. 3, this comprises a tongue 52 which extends the width of plate 46 and terminates in a pawl 54. After inserting the pins 50 through their respective slots 30, the anchor 44 is simply rotated, causing the pawl 54 to enter the slot 32 and make a snap-fit engagement over detent 34. This retains the anchor in position and prevents rotation of the pins 50 in their channels.

As previously explained, the slots 30 of the channels 28 point away from the instrument panel cover. As a result, when the cover 40 breaks away into a position 40' as illustrated in FIG. 2, the force exerted by the extended tether 42' is such as to seat the pin 50 into firmer engagement with its channel.

It is believed that the many advantages of this invention will now be apparent to those skilled in the art. It will also be apparent that a number of variations and modifications may be made therein without departing from its spirit and scope. For example, the male-female function of the anchor/module assembly or of the snap-fit latch members may be reversed, i.e. the female connection can be located on the anchor and the male pin on the module assembly and the detent may be carried by the anchor and the pawl carried by the module assembly. Accordingly the foregoing description is to be construed as illustrative only rather than limiting. This invention is limited only by the scope of the following claims.

We claim:

1. In an automotive airbag installation including an airbag module assembly including a reaction canister positionable behind an instrument panel, a breakaway cover formed in said instrument panel, and a tether having a first end secured to said cover and a second end connectable to said module assembly, the improvement comprising:
   a tether anchor secured to the second end of said tether; and
   means for making a slip-fit engagement between said module assembly and said anchor while providing firm support during cover breakaway resulting from airbag deployment, said engagement means comprises a male connector on one of said anchor and module assembly and a female connector on the other of said anchor and module assembly wherein said female connector comprises a channel having a sidewall defining a slot therethrough and said male connector is insertable through an axial open end of said channel.

2. The improvement of claim 1 wherein said engagement means comprises a male connector on one of said anchor and module assembly and a female connector on the other of said anchor and module assembly.

3. The improvement of claim 2 wherein said male connector is on said anchor.

4. The improvement of claim 3 wherein said female connector comprises at least one substantially cylindrical channel having a sidewall defining a slot therethrough and said male connector comprises a pin insertable through an axial open end of said cylindrical channel.

5. The improvement of claim 1 wherein said female connector comprises first and second spaced, axially aligned channels and said male connector comprises first and second spaced, axially aligned pins insertable into the respective first and second channels.

6. The improvement of claim 4 additionally comprising means for substantially preventing rotation of said pin within said channel.

7. The improvement of claim 6 wherein said rotation preventing means comprises a latch interconnecting said anchor and said module assembly at a point on said anchor spaced from said pin.

8. The improvement of claim 7 wherein said latch comprises a detent on one of said anchor and module assembly and a pawl on the other of said anchor and module assembly.

9. The improvement of claim 8 wherein said detent is carried by said module assembly and said pawl is carried by said anchor.

10. The improvement of claim 3 wherein said female connector comprises at least one substantially cylindrical channel formed in said reaction canister and having a sidewall defining a slot therethrough and said male connector comprises a pin insertable through an axial open end of said cylindrical channel.

11. The improvement of claim 10 wherein said female connector comprises first and second spaced, axially aligned channels and said male connector comprises first and second spaced, axially aligned pins insertable into the respective first and second channels.

12. The improvement of claim 10 additionally comprising means for substantially preventing rotation of said pin within said channel.

13. The improvement of claim 12 wherein said rotation preventing means comprises a latch interconnecting said anchor and said reaction canister at a point on said anchor spaced from said pin.

14. The improvement of claim 13 wherein said latch comprises a detent on one of said anchor and reaction canister and a pawl on the other of said anchor and reaction canister.

15. The improvement of claim 14 wherein said detent is carried by said reaction canister and said pawl is carried by said anchor.

16. The improvement of claim 15 wherein said detent is a channel formed in said reaction canister and substantially parallel to said cylindrical channel.

17. The improvement of claim 16 wherein said pawl comprises a tongue extending from said anchor and latchingly engageable with said detent upon rotation of said anchor about said pin within said substantially cylindrical channel.

18. An automotive airbag installation which comprises:
   an instrument panel including a breakaway portion therein forming a cover;
   a substantially trough-shaped reaction canister mounted behind said cover, said canister having first and second sidewalls, a floor, and first and second end plates for containing an inflator and a folded airbag therein;
   a hinge channel integral with, and protruding from, said first sidewall and slotted along its length to receive a hinge pin therein in slip-fit engagement; and
   a tether having a first end secured to said cover and a second end carrying an anchor member, said anchor member including said hinge pin engageable with said hinge channel in said slip-fit engagement.

19. The installation of claim 18 additionally comprising means for latching said tether anchor to said first sidewall to prevent rotation between said hinge pin and hinge channel.

20. The installation of claim 19 wherein said latching means comprises:
   a detent formed in the first sidewall of said reaction canister; and
   a pawl carried by said tether anchor and engageable with said detent.

* * * * *

UNITED STATES PATENT AND TRADEMARK OFFICE
CERTIFICATE OF CORRECTION

PATENT NO. : 5,398,960
DATED : March 21, 1995
INVENTOR(S) : Ravenberg et al.

It is certified that error appears in the above-indentified patent and that said Letters Patent is hereby corrected as shown below:

At column 3, line 57, "claim 1" should be --claim 4--.

Signed and Sealed this

Twenty-first Day of May, 1996

Attest:

BRUCE LEHMAN

Attesting Officer

Commissioner of Patents and Trademarks